United States Patent [19]

Dulaney et al.

[11] Patent Number: 5,015,546
[45] Date of Patent: May 14, 1991

[54] BATTERY COMPARTMENT

[75] Inventors: Ken L. Dulaney, Redwood City; John J. Daly, San Carlos, both of Calif.

[73] Assignee: Grid Systems Corporation, Fremont, Calif.

[21] Appl. No.: 364,921

[22] Filed: Jun. 12, 1989

[51] Int. Cl.$^5$ .............................................. H01M 3/10
[52] U.S. Cl. ......................................... 429/99; 429/1; 429/9
[58] Field of Search ..................................... 429/1, 99

[56] References Cited

U.S. PATENT DOCUMENTS

| | | | |
|---|---|---|---|
| 4,147,838 | 4/1979 | Leffingwell | 429/1 |
| 4,205,121 | 5/1980 | Naitoh | 429/99 |
| 4,389,469 | 6/1983 | Nicholls | 429/99 |

Primary Examiner—Donald L. Walton
Attorney, Agent, or Firm—Townsend & Townsend

[57] ABSTRACT

A battery compartment for portable electrical equipment such as computers, tape recorders, VCR recorders, camera flash equipment and other such devices has an internal configuration and appropriate electrical connections to receive at least two different types of battery cells which may be of different dimensions. These can include standard dry cell batteries and rechargeable NiCad batteries, for example. The power pickup from the two types of cells is different, so that non-rechargeable dry cells can be isolated from charge when external power is attached to the portable device, while rechargeable cells are not isolated from the charge. The different dimensions are accommodated by orientation of the one type of cell-receiving spaces at right angles to the other type of cell-receiving spaces so that incorrect placement of the cell types is prevented.

17 Claims, 3 Drawing Sheets

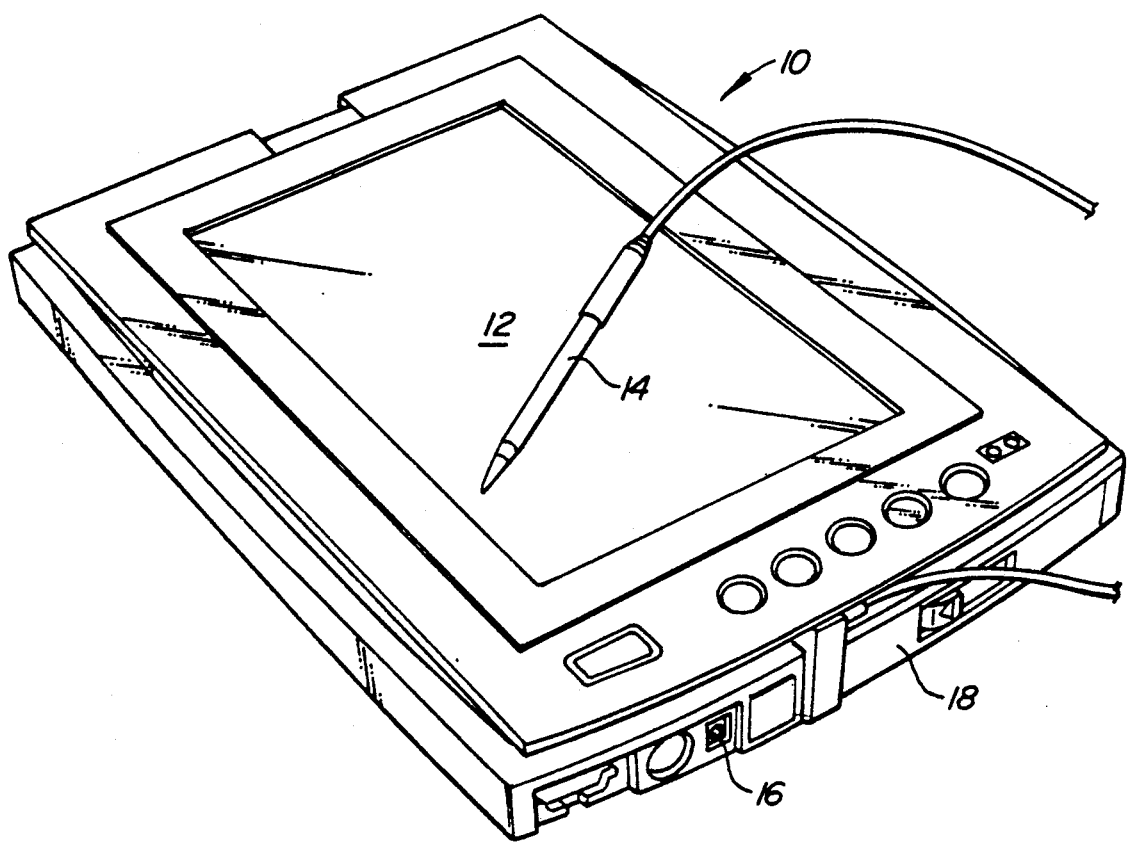
FIG._1.
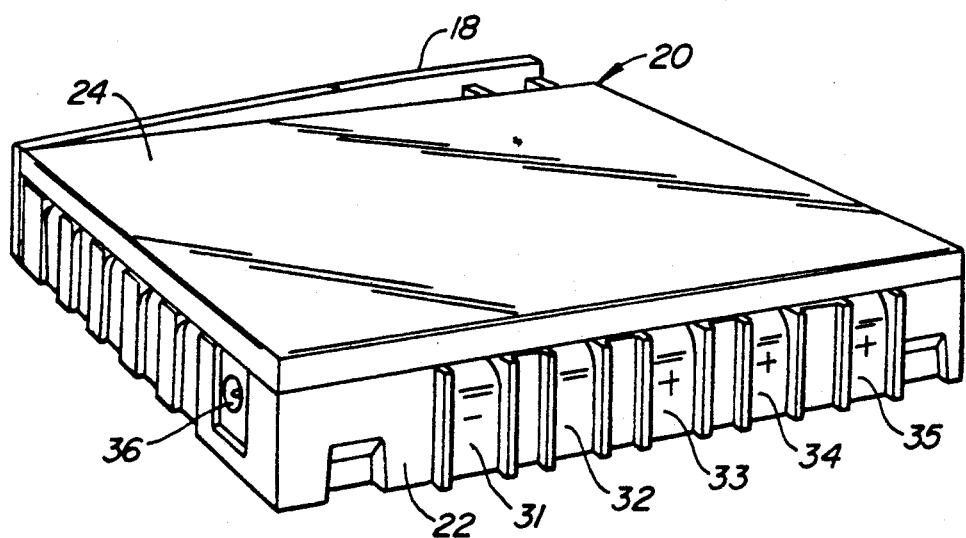
FIG._2.

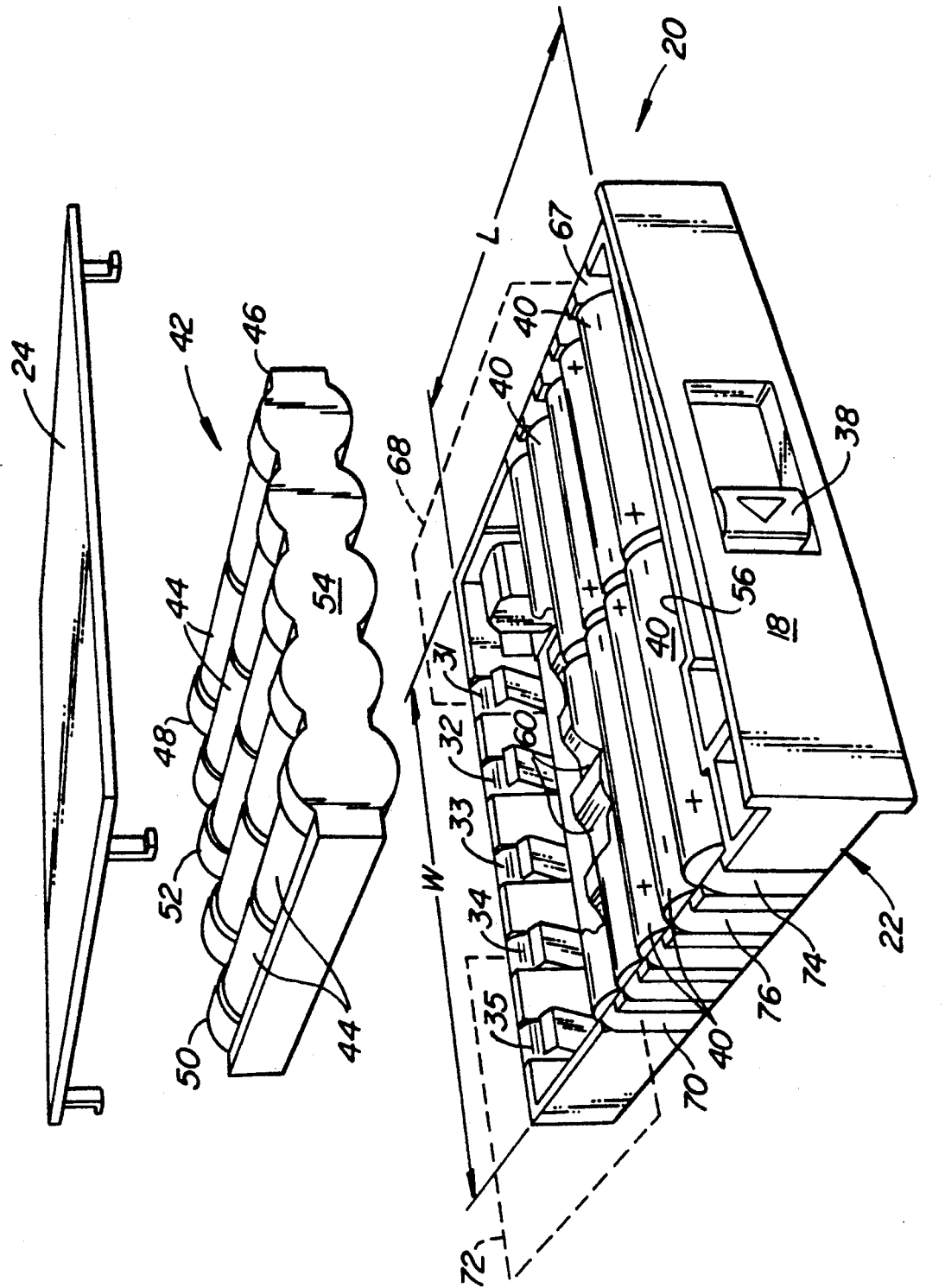
FIG._3.

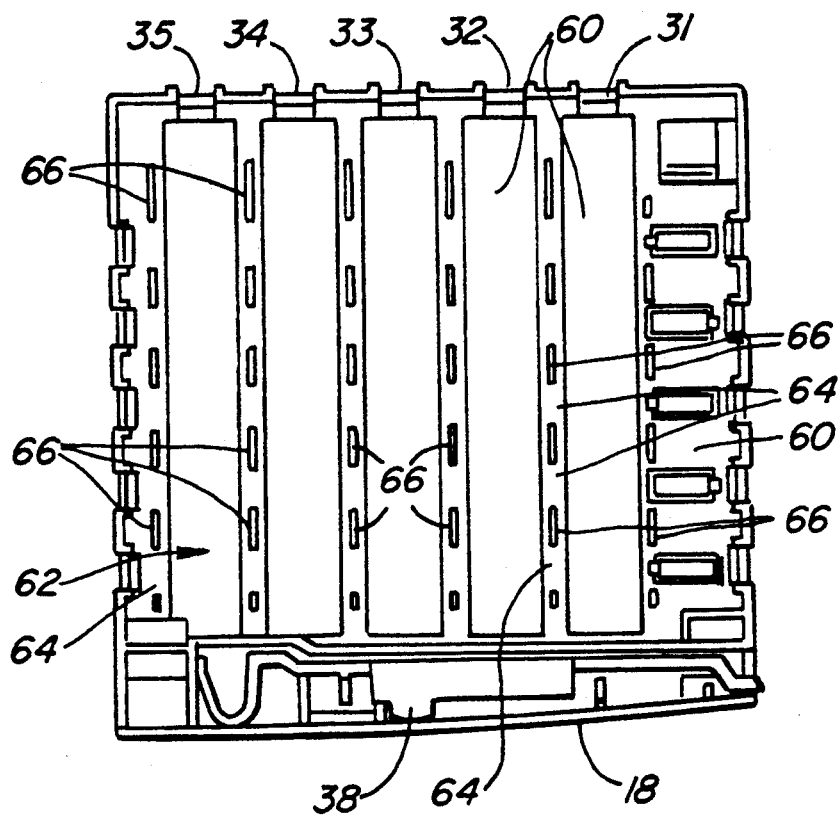
FIG._4.
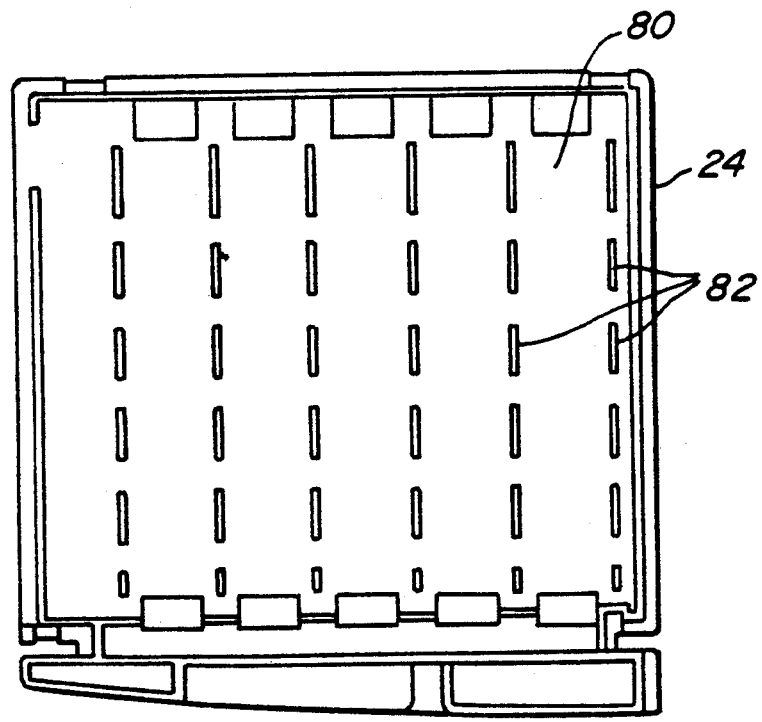
FIG._5.

BATTERY COMPARTMENT

BACKGROUND OF THE INVENTION

The invention relates to battery powered electrical equipment, and in particular the invention is concerned with a battery compartment for a battery powered electrical device that accommodates different types of battery cells, which may be standard dry cells on the one hand, and rechargeable cells on the other hand.

Portable electrical or electronic devices such as camera flashes, tape recorders, games and computers usually can be powered with standard dry cell batteries, such as alkaline type battery cells of standard dimensions. It is often desired to use rechargeable battery cells with these portable devices, and these have been available in several forms.

One type of rechargeable battery cell follows the same dimensions as the alkaline battery cells, so that these cells can be used interchangeably with the throw-away dry cells. Some of these are NiCad rechargeable cells.

However, another and in some ways superior rechargeable battery in wide use comprises NiCad rechargeable cells in different dimensions, shorter in length and larger in diameter than the standard alkaline dry cells. The larger-diameter NiCad cells have greater capacity and generally are bound together and electrically connected into a unitary battery. The battery of NiCad cells is placed as a unit into a battery pack designed for this type of cells, with two output terminals of the battery engaged with appropriately placed conductors in the battery pack. When low, the NiCad battery is charged as a unit.

It has been a limitation of many conventional battery compartments and battery packs and of portable electrical devices in general, that a particular battery compartment could be served only with battery cells of one configuration,—for example either the large-diameter NiCad cells or cells having the conventional dry cell dimensions.

Some portable devices such as video cassette recorder cameras have had provision for the use of either rechargeable or non-rechargeable battery cells. This has been accomplished in some cases by the use of two different battery packs for the VCR camera—one removable pack which may be sealed and which includes a rechargeable battery such as NiCad cells; and another removable pack which can be opened to insert alkaline type dry cells. In theory this can allow the user to purchase alkaline cells on an emergency basis, if the rechargeable battery pack goes too low in charge when the camera is being used. However, in practice it requires the user to anticipate this problem and thus to have the alternate battery pack casing on hand. The user often does not anticipate this situation. The user ordinarily plans on using only the rechargeable pack, does not bring the alkaline cell case, and thus is unable to use alkaline cells when the rechargeable battery pack has lost its charge.

It would therefore be desirable in a great number of portable devices for a battery pack to be capable of receiving either a rechargeable battery or standard dry cells such as alkaline batteries. There have been, however, two problems with this approach. The alkaline dry cells are of different dimensions from those of the optimum NiCad battery pack cells; and a charging current must be prevented from being applied to the dry cells. Such a charging current is normally applied to the rechargeable battery when it is in the portable device and external power (an AC/DC converter) is being applied to the device.

SUMMARY OF THE INVENTION

In accordance with the present invention, a battery compartment or removable battery pack for a computer, a VCR camera, a tape recorder, a camera flash or any other battery-powered device overcomes these problems and permits either a NiCad battery or dry cells of conventional dimensions to be used in the compartment.

The battery pack or compartment of the invention accepts standard dry cells in one orientation and recharges in a different orientation, 90 degrees rotated. The batteries cannot physically be inserted incorrectly. In this way the battery cells of different dimensions are accommodated and, with the different types of cells connected to different sets of contacts in the compartment, the charging current from external power can be prevented from being applied to the dry cells. Accordingly, the same battery compartment casing can be conveniently used with either rechargeable or non-rechargeable batteries. In an emergency when the rechargeable battery goes too low in charge, the rechargeable battery can be removed and alkaline battery cells can be put into the same compartment, with no additional battery carrier or casings required to be on hand. The dry cell batteries cannot be incorrectly inserted into the spaces intended for the rechargeable NiCad cells.

If the rechargeable cells are of different voltage from the standard dry cells, a different numbers of each type of cells can be provided for in the compartment, to essentially equalize the total voltage.

The principles of the invention also apply to rechargeable battery cells which are identical in dimensions to standard dry cells. The rechargeable cells are placed in the 90° rotated orientation and, by the system of contacts in the battery compartment, will receive an externally applied charge while the standard dry cells will not.

It is therefore among the objects of the present invention to enhance the usefulness of portable, battery-powered devices such as computers, tape recorders, VCR cameras, etc. through the provision of a battery compartment which may be fixed in the portable device or removable from the device, for accepting either rechargeable or non-rechargeable battery cells, of different dimensions, or similar dimensions, in the same compartment. A related object is to have different battery orientations for the different kinds of cells, preventing incorrect placement of different-sized batteries in the compartment and thereby preventing a charge from being applied to the dry cell batteries when external power is connected.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without department from the present invention and the purview of the appended claims.

DESCRIPTION OF THE DRAWINGS

FIG. 1 is a perspective view showing a hand held portable computer which may include a battery compartment in accordance with the principles of the invention.

FIG. 2 is perspective view showing a removable battery compartment or case in accordance with the invention, in a rear view showing electrical contacts.

FIG. 3 is an exploded view in perspective, showing the battery compartment of FIG. 2 with a cover removed and with different types of batteries for the compartment indicated.

FIG. 4 is a plan view showing a base portion of the battery compartment, and indicating battery connections within the compartment.

FIG. 5 is a bottom plan view of a cover of a removable battery compartment according to the invention.

DESCRIPTION OF PREFERRED EMBODIMENTS

In the drawings, FIG. 1 shows a hand held computer 10 as an example of a battery powered device which may include a battery compartment according to the invention. The computer 10 in FIG. 1 is shown constructed generally as disclosed in copending patent application Ser. No. 365,147, entitled "Hand Held Notebook Style Computer", filed concurrently with this application and assigned to the same assignee as the present invention. That copending application is incorporated into this application by reference.

The portable hand held computer 10 has a display screen 12 supported by screen write software, allowing information to be entered on the screen and into the computer using a pen or stylus 14, as explained in the referenced copending application. The computer 10 includes an external DC jack 16 which may be used to run the computer on external power, with the input plug of an AC/DC converter inserted into the jack 16. The applied external power will be effective to charge a rechargeable battery contained within the computer.

FIG. 1 also shows a face plate or exterior panel 18 of a removable battery case or compartment within the computer 10 and which may be removed from the computer in the manner of a pull-out drawer. However, it should be understood that the principles of the inventions apply to a battery compartment whether the compartment is fixed within the computer or other portable electrical device (and accessible through a removable panel or door to the battery cells), or removable from the electrical device as indicated in FIG. 1 and as illustrated in the remaining drawings herein.

In FIG. 2 the battery compartment or case 20 is shown from behind, with the front panel 18 at the back left of the figure. The removable case or compartment 20 includes a base 22 and a cover 24. A series of external contacts 31, 32, 33, 34 and 35 are on the outside of the base portion 22 of the casing 20, and may be at the rear as shown, for a drawer-type casing 22 wherein the contact is made when the case is pushed into the electrical device 10.

There may also be included in the battery casing 20 a DC jack 36 of the same configuration as the external computer jack 16, and this is the subject of copending application Ser. No. 364,920, entitled "Externally Rechargeable Battery Pack for a Computer" also filed concurrently with this application, assigned to the same assignee as the present invention and incorporated herein by reference.

FIG. 3 shows the battery case or compartment 20 in exploded view, illustrating the principles of the invention wherein battery cells of different dimensions, including chargeable and non-rechargeable batteries, may be used in the same compartment 20. The compartment 20 may alternatively be configured to receive chargeable and rechargeable battery cells of the same dimensions but in different orientation, within the principles of the invention.

As shown in FIG. 3 and also FIG. 1, the pull-out removable battery case 20 may include a latch device 38 for releasing the case from the electrical device within which it is used. The latch 38 may have an extending tab or latching member, not shown, extending from an edge of the panel 18 (e.g. the right edge, as shown in FIG. 4) and engagable with the housing of the portable electrical device 10.

In FIG. 3 the cover 24 is removed and two different types of batteries are shown: a battery of conventional dry cells 40 (or "primary cells" as they are often known) oriented in a first direction with the cells longitudinal with respect to what may be considered a width W dimension; and a battery 42 of cells 44 ("secondary cells") for orientation in a second direction perpendicular to the first and longitudinal with respect to what may be considered the length L of the battery compartment 22. The battery 42 in this preferred embodiment has cells 44 of different dimensions from the cells 40, e.g. larger in diameter and shorter in length than the cells 40, as is true with the larger capacity NiCad type rechargeable batteries.

As illustrated in FIG. 3, the preferably rechargeable batteries 44 are bound together in the battery 42, physically and electrically, by a battery cell-holding carriage 46. This may be a plastic device partially encasing the cells 44 as shown and with appropriate battery-to-battery connection preferably for connecting the cells in series. A typical NiCad battery 42 will have conductors at 48 and 50 as viewed in FIG. 3, for drawing off power from the battery 42. One of these two conductors will be a ground or negative terminal, and this may be the conductor 48 as in FIG. 3, for engagement with an inner spring contact of the terminal 31 of the battery compartment or case 22. The other conductor 50 of the battery 42 will be a positive terminal, for engagement with the terminal 35 on the battery case.

A variation of the typical NiCad battery pack 42 known as an intrinsically safe NiCad battery pack will have its positive connection in the middle of the battery, at 52 as viewed in FIG. 3, for engagement with a center terminal 33 on the battery case. In this type of battery pack the position 48 will still be the negative or common, engagable with the battery case terminal 31. The other end 54 of the NiCad type rechargeable battery pack 42 will not make any electrical connections with the battery compartment 22.

As can be seen with reference to both FIG. 3 and FIG. 4, the battery case or compartment 22 has an internal recess with provision for seating both types of batteries in the proper respective orientations and positions. This includes the proper length of the recess, in a width dimension W, to accommodate an integral number of the first type of battery cells 40 (two in the example shown in FIG. 3); and also the proper length of the recess in the dimension L in FIG. 3 to accommodate an integral number of the second type of battery cells 44 as an alternative to the cells 40. The position of the cells 44 is at 90 degrees to the position of the cells 40, and the length L is measured generally between the terminals 31-35 and a wall 56 of the recess, against which the inactive end 54 of the rechargeable battery pack 42 will engage.

The provision for alternate types of cells 40 and 44 also includes some means within the battery compartment recess for appropriately locating the cells being used and retaining them in position, i.e some means of defining the cell-receiving spaces. In FIGS. 3 and 4 it can be seen that a series of parallel side-by-side contoured grooves 60 may be provided in a floor 62 of the battery compartment base 20. The grooves 60 are not necessary, but are desirable both to locate the second type of cells 44 (e.g. NiCad cells) and to accommodate their larger diameter so that both type of cells 44 and 40 will reside at the same level of top tangent points in the compartment 20, relative to the top cover 24.

On the other hand, the smaller-diameter first type cells 40 in this preferred embodiment rest on ridges 64 defined between the grooves 60 and also located adjacent to the left and right end grooves 60. These smaller-diameter cells 40 are thus elevated somewhat in the battery compartment recess and are located and retained against movement by bosses or raised areas 66 on the ridges 64, forming cell-receiving spaces within which the cells 40 of the first type will lie.

As discussed above, the rechargeable type battery cells 44 make contact at a ground terminal 31 and a positive terminal 35 of the battery case (or at a positive terminal 33 in the case of intrinsically safe NiCad batteries). FIG. 3 shows that the smaller-diameter first type battery cells 40 (such as alkaline dry cells) are connected such that a negative terminal 67 of the battery comprising the cells 40 is connected to the same common ground terminal 31 as indicated by a dashed line 68. A positive terminal 70 of the battery formed of the cells 40 is connected to the battery case terminal 34 as indicated by a dashed line 72 in FIG. 3. Appropriate connections are made between the battery cells 40 successively in series, such as between battery contact points 74 and 76 shown in FIG. 3. These inter-cell connections are not specifically shown in FIG. 3, although the orientations of positive and negative ends of cells 40 are indicated for this preferred embodiment in FIG. 3.

The contact or terminal 32 shown in FIGS. 3 and 4, engaged by a secondary cell battery pack composed of lithium cells (not shown) but not by the first type battery cells 40, or by the NiCad type 42, comprises a sensor for indicating to the electrical device (mechanically or electronically) which type of battery cells are being used.

The battery case cover 24, as shown in FIG. 5, may have an interior surface 80 with bosses or bumps 82 complementarily positioned with respect to those of the base portion 22, thereby assisting in maintaining the smaller-diameter first type battery cells 40 in the proper positions within the battery case 20.

It is therefore seen that the different type of battery cells 40 and 44 deliver their power from different positions at the external terminals 31-35 of the battery case, i.e. from different pairs of terminals. The pair of terminals 31 and 34 serve, respectively, as negative or ground and positive for the small-diameter cells 40; and the pair of terminals 31 and 35 serve, respectively, as ground and positive for the second type cells 44, e.g. the NiCad battery pack (with the terminal 33 serving as positive in the intrinsically safe NiCad type battery pack). Accordingly, the portable electrical device 10 in which the batteries are loaded has an indication as to which type of cells are being used. If the active positive terminal is the terminal 34, engaging an appropriate mating terminal within the computer or other electrical device, the electrical device will be able to draw power from the battery comprising the first type cells 40, but will be unable to conduct any charge back into the battery cells 40 when the computer or other device is connected to external power. This can easily be accomplished by appropriate switching within the electrical device, e.g. using diodes.

However, if the electrical device senses voltage from the ground 31 and the positive terminal 35, corresponding to the second type battery pack 43 and cells 44, it can either draw power from the battery pack or charge the battery pack when external power is applied to the electrical device. If voltage is sensed from the pair of terminals 31 and 33, this constitutes an indication that the intrinsically safe NiCad type battery is being used. The instrinsically safe NiCad type battery operates in the same manner as standard NiCad cells.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a portable, battery-powered electrical device, a battery compartment for accepting different types of battery cells, comprising,
    a casing with a generally rectangular recess having a width dimension and a length dimension, the width dimension being suitable for receiving longitudinally an integral number of battery cells of a first type and the length dimension being suitable for receiving longitudinally an integral number of battery cells of a second type,
    first electrical contact means disposed on a first inside wall of the casing for drawing power from the battery of cells of the second type when present, and second electrical contact means disposed on second and third inside walls of the casing for drawing power from the battery of cells of the first type when present, and
    battery location means for holding the battery of cells of the first type in first preselected positions within the recess, and for holding the battery of cells of the second type in second preselected positions within the recess, the second cell positions being substantially perpendicular to the first cell positions.

2. A battery compartment according to claim 1, wherein the battery cells of both types have top tangent points, the battery cells of the first type, oriented longitudinally with respect to said width dimension, being smaller in diameter than the battery cells of the second type, and the compartment including means for maintaining the top tangent points of the different types of cells at substantially the same level within the recess.

3. A battery compartment according to claim 2, wherein said means for maintaining the different types of cells at substantially the same level comprises a floor in the recess having a series of parallel side-by-side grooves shaped for receipt of the second type battery cells, which are of a larger diameter than the first type battery cells, with ridges formed between the grooves, with means for supporting the first type battery cells, when present, perpendicularly on top of the ridges between the grooves.

4. A battery compartment according to claim 1, wherein the battery cells of the first type are dry cells and wherein the battery cells of the second type are larger-diameter but shorter-length rechargeable NiCad cells.

5. A battery compartment according to claim 4, wherein the second type cells or NiCad cells are bound together physically and electrically in a cell-holding carriage to form a bound NiCad battery with positive and negative power output contacts at preselected locations on the bound NiCad battery positioned to be engaged by the first electrical contact means, and wherein the dry cells or cells of the first type lie between the second and third inside walls of the compartment recess, both perpendicular to said first inside wall, and the compartment having a first pair of external terminals connected to the first electrical contact means and a second, different pair of external terminals connected to the second electrical contact means, said first and second pairs of external terminals being connected separately to the electrical device.

6. A battery compartment according to claim 1, wherein said battery locating means comprises a series of parallel cell-receiving grooves oriented lengthwise and configured to conform to and receive the exterior surfaces of the battery cells of the second type, with ridges formed between the parallel grooves, and raised bosses on the ridges defining positions of the battery cells of the first type and holding said first type cells in said first preselected positions lying perpendicularly on top of the ridges.

7. A battery compartment for accepting different types of battery cells, comprising:
   a battery case with a generally rectangular recess having a width dimension and a length dimension, the width dimension being suitable for receiving longitudinally an integral number of battery cells of a first type and the length dimension being suitable for receiving longitudinally an integral number of battery cells of a second type,
   electrical contact means for drawing power from the battery of cells of the first type when present, and for drawing power from the battery of cells of the second type when present,
   a floor of the battery compartment having a series of parallel grooves for holding cells of the selected type in the second preselected positions within the recess, with ridges formed between the parallel grooves, and raised bosses on the ridges for defining the location of the cells of the first type in the first preselected positions, the first cell positions being substantially perpendicular to the second cell position, and
   the battery case being removable from a portable electrical device, and including a series of external contacts on the exterior of the removable battery case, with battery connection means for connecting the battery cells of the first type in series to a first pair of external electrical contacts on the exterior of the battery case, and for connecting the battery cells of the second type in series to a second, different pair of external electrical contacts on the exterior of the battery case, whereby the portable electrical device can be connected separately to said first pair and second pair of external electrical contacts, so that the connection of the first type of cells to the electrical device can be different from the connection of the second type of cells to the electrical device.

8. A battery compartment according to claim 1 with provision for accepting either non-rechargeable battery cells or rechargeable battery cells, and wherein said electrical contact means includes means providing different power pickups for the different types of cells and for enabling isolation of the non-rechargeable battery cells from a charging current when the portable electrical device is connected to external power, while still enabling a charging current to be applied to the rechargeable battery cells, when present.

9. A battery compartment according to claim 8, wherein the means providing different power pickups includes at least three power output conductors in the battery compartment, including separate positive power output conductors for the battery of rechargeable cells and the battery of non-rechargeable cells.

10. A battery compartment for a portable electrical device, for receiving different types of battery cells of different dimensions, comprising,
   a generally rectangular battery compartment housing with means for accessing the interior of the housing to insert and remove battery cells,
   a floor in the housing having a first means for locating and orienting a first type of battery cells in parallel and side-by-side relationship and longitudinally in a first orthogonal direction within the generally rectangular housing,
   the battery compartment floor having a second means for locating and orienting a second type of battery cells of different dimensions from the first type of cells in a longitudinal orientation in a second orthogonal direction perpendicular to that of the first set of battery cells such that the orientation of the second set of cells crosses that of the first set,
   the length of the battery compartment housing in the first direction being such as to generally correspond to the length of an integral number of battery cells of the first type, and the length of the battery compartment housing in the second direction being such as to generally correspond to the length of an integral number of battery cells of the second type,
   external electrical terminals on the battery compartment housing for engaging with corresponding terminals in the portable electrical device, with a first pair of terminals for the first type cells and a second, different pair of terminals for the second type cells, and
   electrical contact means for connecting the first and second pairs of terminals to receive power from either the first type battery cells or the second type battery cells, respectively, whichever is contained in the battery compartment.

11. A battery compartment according to claim 10 with provision for accepting either non-rechargeable battery cells or rechargeable battery cells, and wherein said electrical contact means includes means providing different power pickups for the different type of cells and for enabling isolation of the non-rechargeable battery cells from a charging current when the portable electrical device is connected to external power, while still enabling a charging current to be applied to the rechargeable battery cells, when present.

12. A battery compartment according to claim 11, wherein the means providing different power pickups includes at least three power output conductors in the battery compartment, including separate positive power output conductors for the battery of rechargeable cells and the battery of non-rechargeable cells.

13. A battery compartment for accepting battery cells of different dimensions, for use in a portable electrical device, comprising:

a rectangular casing having a width dimension and a length dimension, the width dimension being suitable for receiving longitudinally an integral number of battery cells of a first type and the length dimension being suitable for receiving longitudinally an integral number of battery cells of a second type, electrical contact means for drawing power from the battery of cells of the first type when present, and for drawing power from the battery of cells of the second type when present, and battery location means for holding the battery of cells of the first type in first preselected positions within the recess, and for holding the battery of cells of second type in second preselected positions within the recess, the second cell positions being substantially perpendicular to the first cell positions, and means for generating a signal to the portable electric device for indicating which type of battery cells is being used.

14. The battery compartment according to claim 13 wherein the electrical contact means comprises first electrical contact means disposed on a first inside wall of the compartment for connection to cells of the second type and second, separate electrical contact means disposed on second and third inside walls of the compartment for connection to cells of the first type.

15. The battery compartment according to claim 13 further comprising a battery case removable from the portable electrical device, and including a series of external electrical contacts on the exterior of the removable battery case, with battery connection means for connecting the battery cells of the first type in series to a first pair of external electrical contacts on the exterior of the battery case, and for connecting the battery cells of the second type in series to a second, different pair of external electrical contacts on the exterior of the battery case, whereby the portable electrical device can be connected separately to said first pair and second pair of external electrical contacts, so that the connection of the first type of cells to the electrical device can be different from the connection of the second type of cells to the electrical device.

16. The battery compartment according to claim 13, wherein the batteries of the first type are dry cells and the batteries of the second type are rechargeable NiCad cells.

17. The battery compartment according to claim 16, wherein the electrical contact means includes means for isolating the non-rechargeable dry cells from a charging current when the portable electrical device is connected to external power while still enabling a charging current to be applied to the rechargeable NiCad battery cells when present.

* * * * *